United States Patent [19]

Schott

[11] 4,424,629
[45] Jan. 10, 1984

[54] APPARATUS FOR CUTTING TUBES AND THE LIKE

[75] Inventor: Donald E. Schott, Chester, Vt.

[73] Assignee: Thomas C. Wilson, Inc., Long Island City, N.Y.

[21] Appl. No.: 206,548

[22] Filed: Nov. 13, 1980

[51] Int. Cl.³ ............................................ B23D 21/06
[52] U.S. Cl. ..................................................... 30/105
[58] Field of Search ................. 30/105, 106, 107, 108, 30/103, 104

[56] References Cited

U.S. PATENT DOCUMENTS

| 55,391 | 6/1866 | Thomas | 30/107 |
|---|---|---|---|
| 341,046 | 5/1886 | Nuebling | 30/107 |
| 422,725 | 3/1890 | Chesebro | 30/108 |
| 665,578 | 1/1901 | Ord | 30/105 |
| 806,878 | 12/1905 | Doyle | 30/106 |
| 872,290 | 11/1907 | Lusk | 30/105 |
| 1,007,330 | 10/1911 | Browder | 30/104 |
| 1,100,760 | 6/1914 | Morelli | 30/105 |
| 1,108,171 | 8/1914 | Henrikson | 30/105 |
| 1,316,145 | 9/1919 | Doyle | 30/106 |
| 1,499,429 | 7/1924 | Wiedeke | |
| 1,789,572 | 1/1931 | Wiedeke | |
| 1,835,651 | 12/1931 | Ihsen | 30/106 |
| 2,028,578 | 1/1936 | Wiedeke | |
| 3,999,292 | 12/1976 | Breese | 30/105 |
| 4,090,382 | 5/1978 | Schott | |
| 4,099,400 | 7/1978 | Schott | |
| 4,186,584 | 2/1980 | Schott | |

FOREIGN PATENT DOCUMENTS

| 791314 | 9/1935 | France | 30/105 |
|---|---|---|---|
| 52-60487 | 5/1977 | Japan | 30/105 |

*Primary Examiner*—Frederick R. Schmidt
*Assistant Examiner*—J. T. Zatarga
*Attorney, Agent, or Firm*—Pennie & Edmonds

[57] ABSTRACT

An apparatus for cutting a pipe includes a housing member comprising a cutter body member having a collar. The cutter body member is configured at one end for insertion into a portion of the pipe to be cut. A piston chamber within the cutter body member is in communication with an aperture in the surface of the cutter body member. The collar preferably is a flange which is positioned at the other end of the cutter body. The flange extends in spaced relationship about the cutter body toward the pipe portion to be cut and is configured so as to overlay the portion of the pipe to be cut. A cutter wheel is rotatably disposed on a piston which is slidably moveable within the piston chamber. A hydraulically controlled mechanism is provided for advancing the cutter wheel toward the portion of the pipe to be cut so as to provide for cutting of the pipe at a predetermined depth of penetration. A rotary mechanism is also provided for rotating the housing during the penetration of the cutter wheel so as to permit the cutter wheel to circumferentially cut the portion of the pipe at the predetermined rate.

12 Claims, 8 Drawing Figures

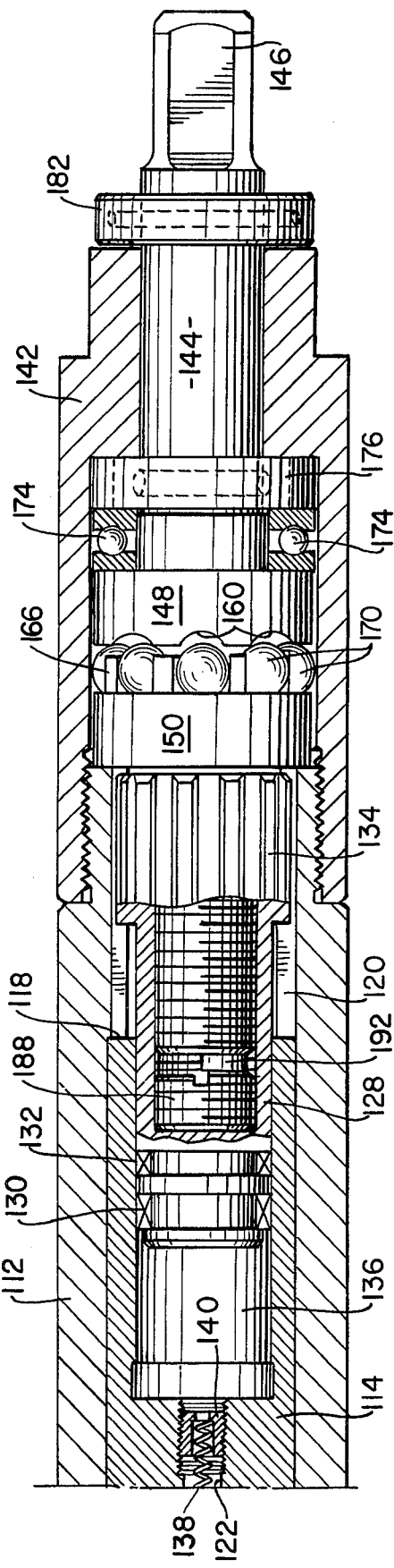
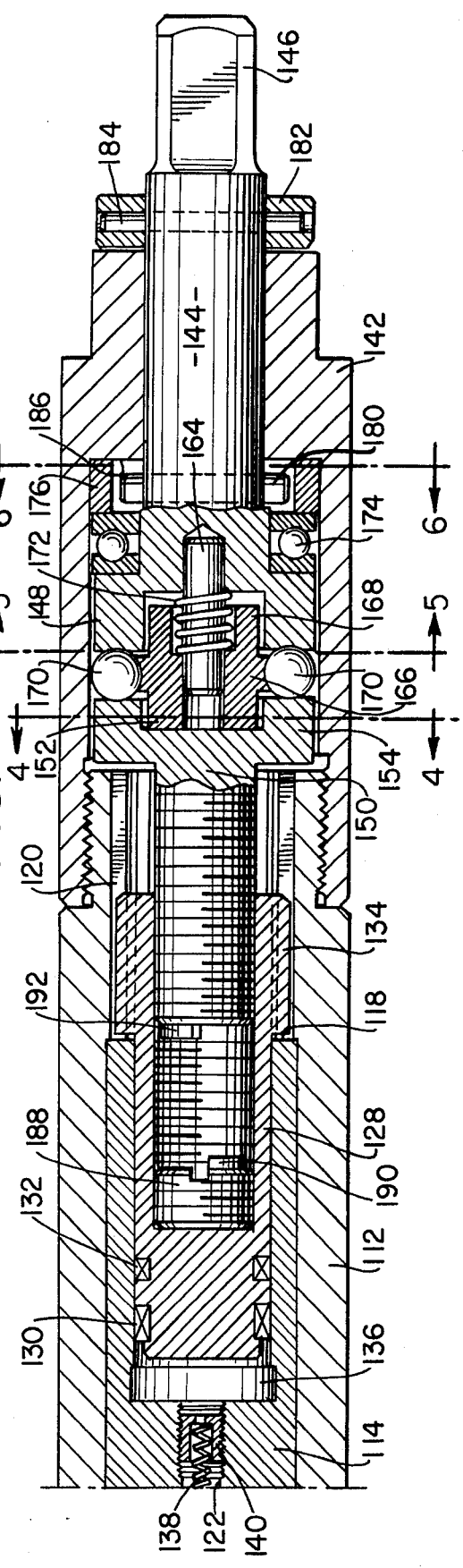
FIG. 1B
FIG. 2B

APPARATUS FOR CUTTING TUBES AND THE LIKE

TECHNICAL FIELD

This invention relates to a cutting device and more particularly to an apparatus for cutting fire tubes already installed for carrying flue gases.

BACKGROUND ART

In typical fire tube cutting operations, a fire tube is placed in a retained position and cut by a cutting tool applied to the outside circumference of the tube at the position where the cutting is desired. Although this operation might be satisfactory for fire tubes which are easily movable, a problem arises with fire tubes already installed e.g., one such situation involves fire tubes which are installed in a heat exchange system. The location of the fire tubes in such cases may be such that circumferential cutting of the tube around its outer surface is either impossible, impractical, or undesirable.

There are tools available in the prior art which are capable of performing the desired operation but suffer from certain drawbacks. The specific use envisioned and illustrated in this particular case favors the use of a well known tool which is one that performs a "chipless" cutting operation as opposed to the type of tool that presents a tool bit to the surface similar to that used in a lathe or similar chip making metal cutting operation. The operational and housekeeping advantages of the "chipless" tube cutter outweigh the design and manufacturing problems associated with tools of this type. One of the causes of difficulties has been that the force necessary to enable the cutting wheel to penetrate into and cut through the tube wall is many times greater than that required to rotate the tool carrying the cutter. Compounding of the difficulty is occasioned because the cutter force must be applied in a direction at right angles to the axis of the tool and since there are physical limitations on the size of the components by virtue of the necessity of operating inside of the tube to be cut, excess stress and wear has been experienced by certain elements of these tools.

Moreover, typical tube cutting operations, such as that possible with the devices disclosed in U.S. Pat. Nos. 1,499,429; 1,789,572; and 2,028,578, generate such substantial great torque loads that a two man operation is required for safety purposes. In addition, such operations often involve single rotation cuttings which require excessive torques that in turn result in damage to or roughening of the resulting tube edge.

Prior art tools have also required two separate power inputs to perform the desired operation. This required the inputs to be made in sequence and thus add to the time required to cut a tube and/or use two men. The latter practice would decrease the time required but often led to premature tool breakdown because of the difficulty of properly synchronizing their efforts.

I have invented an apparatus and a method for cutting tubes which overcomes the above-noted limitations of the prior art.

DISCLOSURE OF INVENTION

The invention relates to an apparatus for cutting a portion of a tube comprising housing means having at least a first end configured and dimensioned for insertion into the tube to be cut, cutting means disposed adjacent the inner wall of the tube portion to be cut when the first end of the housing is inserted within the tube, means for advancing the cutting means outwardly with a predetermined and controlled force to a predetermined depth of penetration, and means for rotation the housing means so as to permit the cutting means to circumferentially cut the tube.

In an alternate embodiment, the apparatus further comprises means for increasing the cutting force applied by the cutting means against the inner wall of the tube up to a predetermined and controlled force so as to cause the cutting means to correspondingly further penetrate the tube. Also, the means for rotating the housing means causes the cutting means to traverse a substantially inner circumferential path and to cut the inner wall of the tube to a predetermined depth corresponding to the level of penetration of the cutting means into the wall of the tube to be cut. The apparatus may further comprise means to progressively maintain the predetermined force applied by the cutting means against the inner wall surface portion of the tube as the housing means is caused to continuously rotate such that continuous rotation of the housing means results in progressively increasing internal cutting of the tube until the cutting means completely penetrates the wall of the tube so as to cut the tube.

Preferably, the advancing means is hydraulic.

In a preferred embodiment, an apparatus for cutting a pipe comprises housing means including a cutter body member having one end configured for insertion into at least a portion of a pipe to be cut, the cutter body having at least one aperture in a surface portion thereof, and at least one chamber therein being in communication with the aperture, a collar disposed at the other end of the cutter body, the collar including a flange extending in spaced relationship about the cutter body toward the pipe portion to be cut, and the flange being configured so as to overlay the portion of the pipe to be cut, a piston configured and positioned within the chamber so as to be slidably moveable therein, at least one cutter wheel mounted and positioned on the piston so as to be moveable therewith, means for advancing the cutter wheel toward the portion of the pipe to be cut such that the cutter wheel cuts the portion of the pipe to a predetermined depth in each of a plurality of progressive successive stages, and means for rotating the housing means between each of the progressive successive stages so as to permit the cutter wheel to circumferentially cut the portion of the pipe to a predetermined depth between the progressive successive stages.

In an alternate preferred embodiment, an apparatus for cutting a pipe comprises housing means including a cutter body member having one end configured for insertion into at least a portion of a pipe to be cut, the cutter body having at least one aperture in a surface portion thereof, and at least one chamber therein being in communication with the aperture, a collar disposed at the other end of the cutter body, the collar including a flange extending in spaced relationship about the cutter body toward the pipe portion to be cut, and the flange being configured so as to overlay the portion of the pipe to be cut, a piston configured and positioned within the chamber so as to be slidably moveable therein, at least one cutter wheel mounted and positioned on the piston so as to be moveable therewith, means for advancing the cutter wheel toward the portion of the pipe to be cut such that the cutter wheel cuts the portion of the pipe to a predetermined depth, and means for rotating the housing means such that the cutter wheel continuously circumferentially cuts the portion of the pipe to the predetermined depth.

Preferably, the advancing means comprises hydraulic fluid which is disposed within the chamber and confined therein by the piston. Also, means are provided for applying pressure to the hydraulic fluid within the chamber so as to advance the piston and thereby the cutter wheel toward the portion of the tube to be cut. In a preferred embodiment, the pressure applying means comprises a regulator piston having a generally tubular portion at one end thereof extending toward the rearward end of the cutter body member. The regulator piston has an axial bore in fluid communication with the piston chamber. A regulator valve is disposed at the other end of the regulator piston and has an axial bore in fluid communication with the axial bore of the regulator piston. The axial bore of the regulator valve has a seat therein.

In addition, the pressure controlling means comprises means such as a valve member for sealing the piston chamber against any further pressure buildup after the pressure developed against the piston is sufficient to advance the cutter wheel to the predetermined depth. The valve member has a configuration compatible with the seat of the regulator valve and is biased in a spaced relationship from the seat. A first compressed spring is provided and positioned about the regulator piston so as to bias the valve member cut away from the seat of the regulator valve. A second compressed spring biases the valve member toward the seat.

Also, the housing means further includes a plunger body defining a plunger chamber therein in fluid communication serially with the axial bore of the regulator valve, the axial bore of the regulator piston, and the piston chamber, and a plunger disposed within the plunger chamber such that movement of the plunger piston in the direction of the one end of the cutter body member decreases the volume of the plunger chamber so as to provide for transmission of a pressure by means of the hydraulic fluid against the piston within the chamber of the cutter body member and thereupon the advancement of the cutter wheel to the predetermined depth of penetration.

The present invention is also directed to a method for cutting a portion of a tube with cutting means fixed to housing means having one end configured and dimensioned for insertion into the tube to be cut comprising inserting one end of the housing means into the tube so as to position the cutting means adjacent the portion of the tube to be cut, advancing the cutting means outwardly so as to cause the cutting means to forcibly cut the inner wall surface of the tube to be cut, increasing the cutting force applied by the cutting means against the inner wall of the tube up to a predetermined and controlled force so as to cause the cutting means to correspondingly further penetrate the tube, rotating the housing means so as to cause the cutting means to traverse a substantially inner circumferential path and to cut the inner wall of the tube to a predetermined depth corresponding to the level of penetration of the cutting means into the wall of the tube, and maintaining the predetermined force applied by the cutting means against the inner wall surface portion of the tube as said housing means is caused to continuously rotate such that continuous rotation of the housing means results in progressively increasing internal cutting of the tube until the cutting means completely penetrates the wall of the tube so as to cut the tube.

BRIEF DESCRIPTION OF THE DRAWINGS

The present invention is described in detail below with reference to the drawings in which:

FIGS. 1A and 1B are partial cross-sectional views of an apparatus for cutting tubes according to the present invention.

FIGS. 2A and 2B are partial cross-sectional views of the apparatus of FIGS. 1A and 1B in operation for cutting a tube.

BEST MODE FOR CARRYING OUT THE INVENTION

Any reference herein to direction or orientation is intended for purposes of the description and is not to be considered as limiting the present invention or the claims thereto to the preferred embodiment described herein.

Figure 1A:
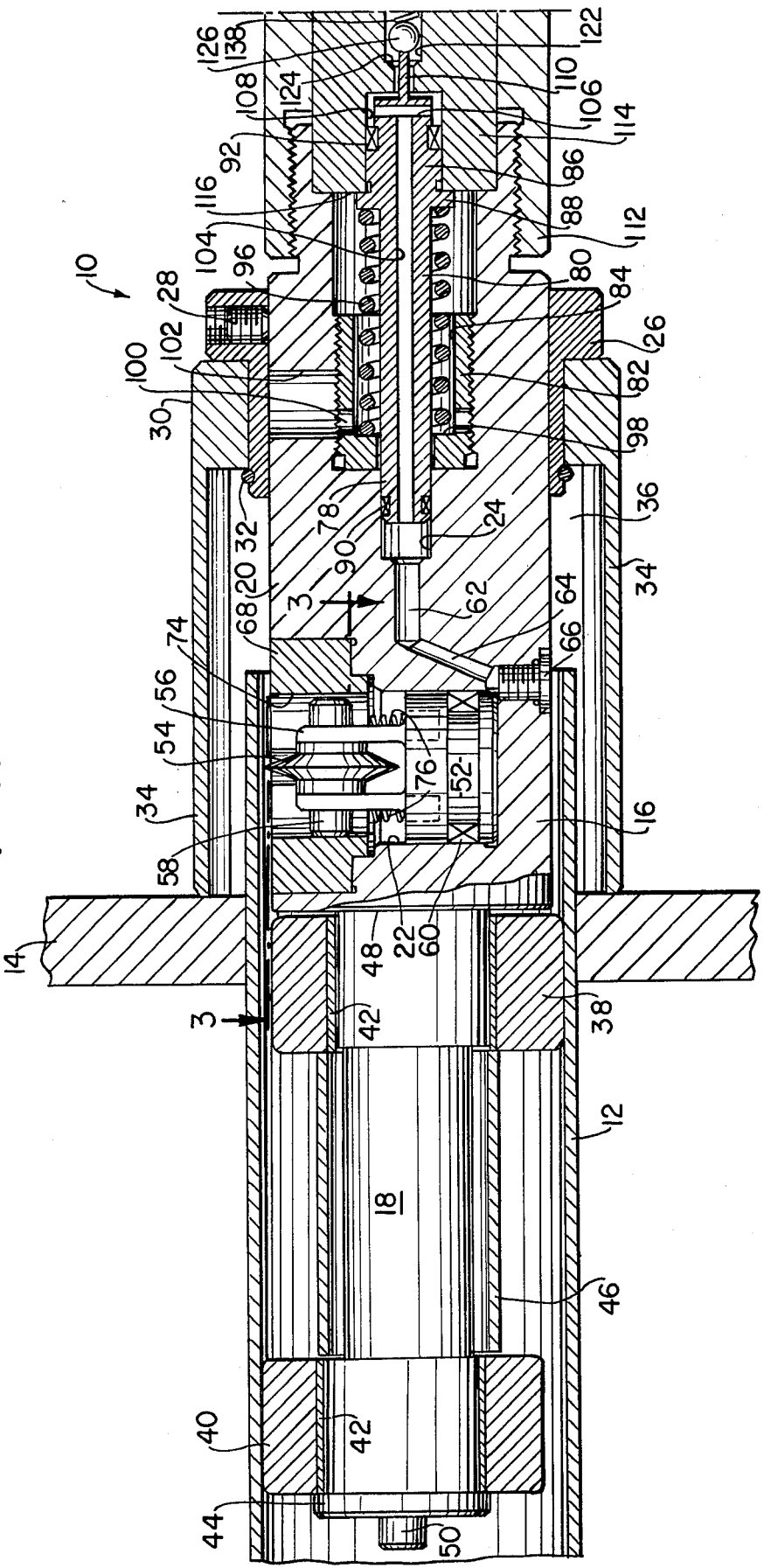

Referring to the drawings, FIGS. 1A–1B illustrate a cutting tool used to internally cut a tube or a pipe 12 extending through an aperture in a tube sheet 14.

The sheet 14 typically is a wall of a furnace or boiler containing a plurality of fire or boiler tubes 12 whose ends terminate in opposing sheets of the furnace. The cutting tool 10 includes a cylinder-like cutter body 16 having a forward end in the form of a shaft 18 and a rear chamber end 20. The shaft 18 disposed at the forward end of cutter body 16, is configured for insertion into the tube 12. The shaft 18 has a smaller diameter than the rear chamber end 20. The rear chamber end 20 includes a vertical piston chamber 22 and an axially orientated bore 24.

An annular collar body 26 is disposed about the rear of the chamber end 20 of the cutter body 16. A set screw 28 is threaded into a hole in the collar body 26 to secure the collar body 26 in a fixed position relative to the cutter body 16. If desired, the set screw 28 can be loosened and the collar body moved along the surface of the cutter body 16. The purpose of this movement of the collar body 26 will be more fully described hereinbelow.

The collar body 26 has connected thereto as shown, a collar bearing 30, retained by a snap ring 32, supporting an annular flange 34 extending about the cutter body 16 in a spaced relationship therefrom and projecting toward the shaft 18. Thus the flange 34 and cutter body 16 create an annular region 36 into which the tube 12 can project.

Eccentrically mounted guide rolls 38 and 40 are positioned on guide bushings 42 as shown in FIG. 1A. The guide rolls 38 and 40 provide support for and centralize the tool 10 in the tube 12. The guide roll 40 closest to the forward end of shaft 18 is retained by washer 44 and separated from the other guide roll 38 by a spacer 46.

Figure 2A:
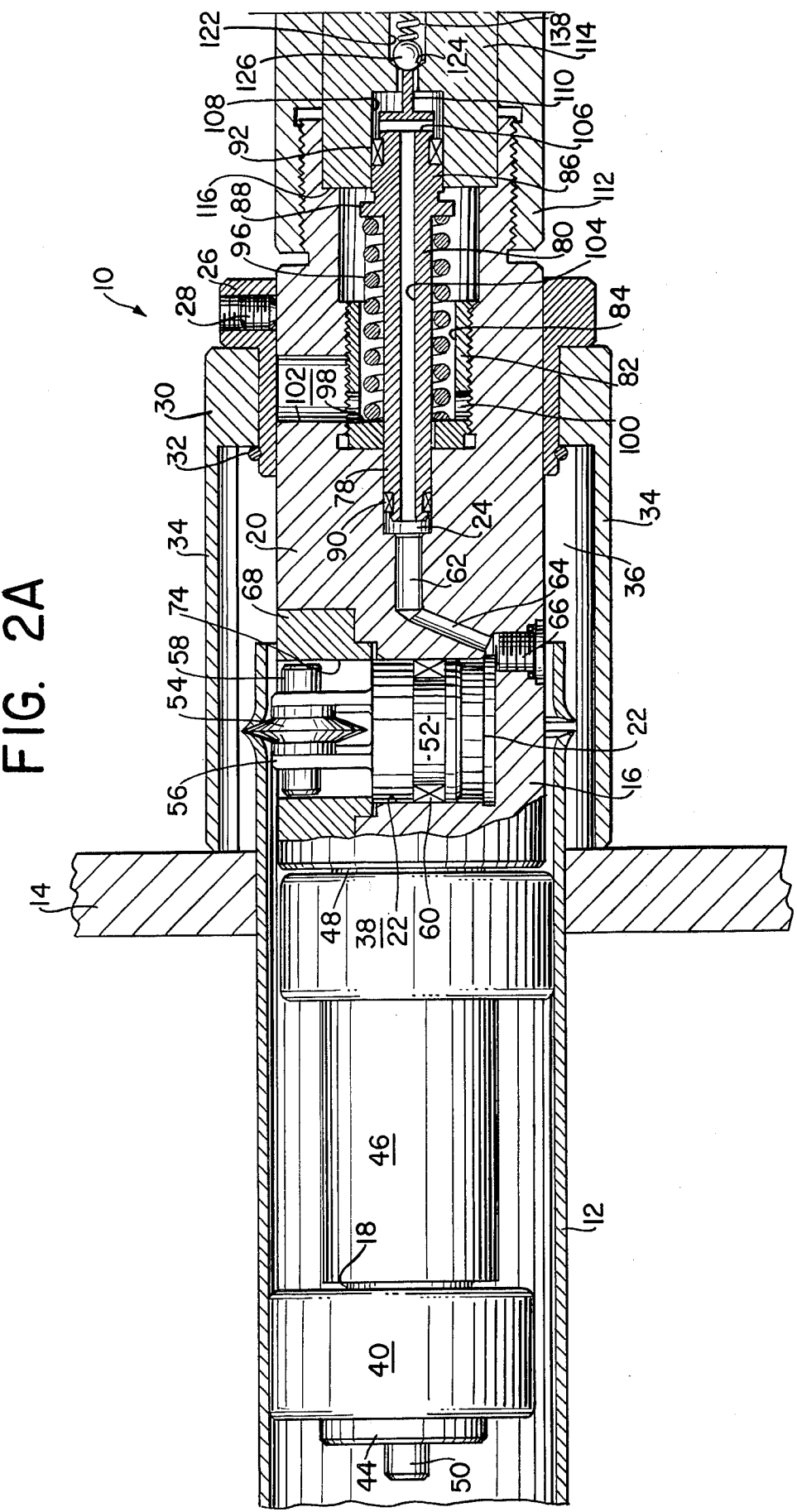

The other guide roll 38 is retained between spacer 46 and a shoulder 48 on the cutter body 16. A bolt 50 positioned on the shaft 18 forward of the washer 44 keeps the guide rolls 38, 40 as well as the supporting and intervening structure on the shaft 18. The guide rolls 38, 40 are mounted so that they provide support at opposite diametral portions within the tube 12 as shown in FIGS. 1A and 2A.

Figure 3:
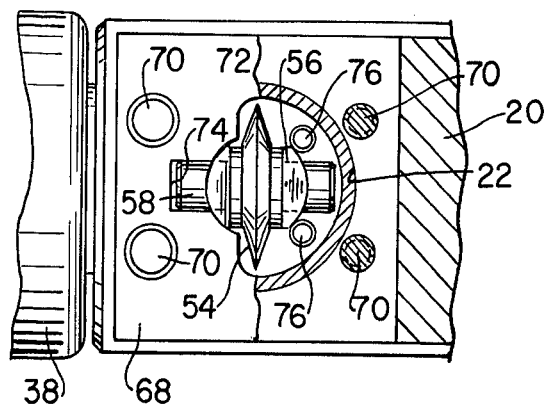
FIG. 3 is a top and partial view taken along line 3—3 of FIG. 1A of a portion of the apparatus illustrating the cutting wheel.

A piston 52 is positioned within piston chamber 22. A cutting wheel 54 is positioned between the upright support walls 56 of the piston 52 and centered and rotationally positioned therebetween on a cutter pin 58. Adjacent its inner face within chamber 22 the piston 52 is grooved so as to receive a pressure seal 60. The pressure seal 60 provides a fluid tight seal against the inner walls of the piston chamber 22 as the piston 52 moves therein. An axially oriented passageway 62 communicates with the piston chamber 22 through transverse bore 64. A filling plug 66 is screwed into a bore communicating with the piston chamber 22 in the cutter body 16. As shown more clearly in FIG. 3, a piston cap 68 is secured by countersunk screws 70 to cutter body 16 and has an aperture 72 through which the cutter wheel 54 can pass to engage tube 12. Slots 74 are provided to guide cutter pin 58 and retain cutter wheel 54 at right angle relationship to the longitudinal axis of tool 10. Four springs 76 countersunk into piston 52 and cap 68 provide a restoring force to assure retraction of piston 52.

The rear of the chamber end 20 of the cutter body 16 has a bore 24 to receive the stem 78 of regulator piston 80. A regulator adjuster 82 having an axial bore 84 is disposed axially with stem 78 of regulator piston 80. The regulator adjuster 82 is threadedly engaged with the respective portion of cutter body 16. The regulator piston 80 is of a generally rod-like configuration and has a forward portion or stem 78 which extends through bore 84 in regulator adjuster 82 and a rear portion 86. The forward portion or stem 78 and rear portion 86 are separated by an annular flange 88 and grooves having pressure seals 90 and 92 which are provided on stem 78 and rear portion 86, respectively.

A regulator spring 96 is positioned circumferentially about the stem 78 of regulator piston 80 and is retained in a compressed state between the flange 88 and shoulder 98 internally of the regulator adjuster 82. Regulator adjuster sleeve 82 has holes 100 in its periphery into which a pin can be inserted through opening 102 providing a means to adjust the force exerted by the regulator spring 96. The regulator piston 80 has an axially oriented conduit 104 communicating at its forward end with cylindrical bore 24 and a transverse passageway 106 communicating with the rear region 108 of the regulator piston 80. Projection 110 is disposed on the axis of and at the rear of regulator piston 80. The purpose of projection 110 will be more fully explained below.

A hollow plunger body 112 is threadedly engaged over the rearmost portion of cutter body 16. Plunger sleeve 114 is positioned within plunger body 112 and is secured by the abutment of its forward face 116 against the rear of the cutter body 16 and abutment of its rear face 118 against the end of internal spline 120 in plunger body 112. Plunger sleeve 114 has an axially oriented bore 122 to receive projection 110 and a seat 124 to receive regulator valve ball 126. Rearwardly of the regulator valve ball 126 the plunger sleeve 114 has a plunger 128 having pressure seals 130 and 132 at its forward end and at its rear end, respectively. The plunger 128 also has an external spline 134 mating with internal spline 120 in plunger body 112. The plunger 128 is slidably received within a fluid chamber 136 of plunger sleeve 114. The axial bore 122 is in fluid communication with the piston chamber 22 as well as the axial bore 122 of the plunger sleeve 114. The regulator valve ball 126 cooperates with seat 124 to seal off region 108 from the fluid chamber 136 of plunger sleeve 114. The valve ball 126 is biased toward projection 110 and seat 124 by a spring 138 housed within the axially oriented bore 122 in plunger sleeve 114 and retained by hollow threaded member 140.

Figure 4:
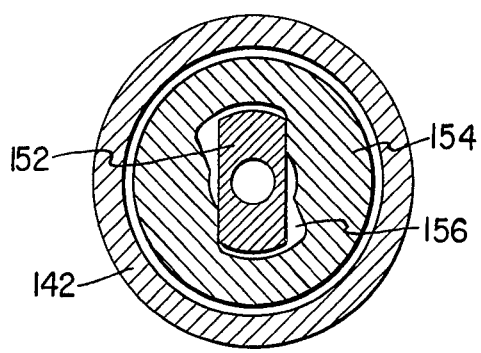
FIG. 4 is a cross-sectional view along line 4—4 of FIG. 2B of the lost motion connection of the spindle coupling and the drive spindle.
Figure 5:
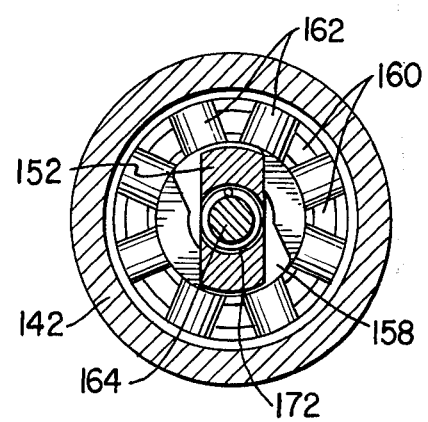
FIG. 5 is a cross-sectional view taken along line 5—5 of FIG. 2B of the lost motion connection of the spindle coupling with the drive shaft.
Figure 6:
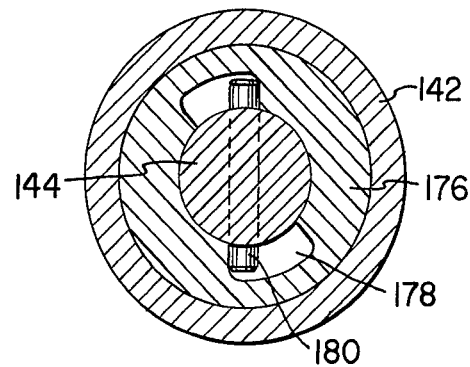
FIG. 6 is a cross-sectional view taken along line 6—6 of FIG. 2B of the lost motion connection between the drive shaft and thrust washer.

The plunger body 112 is threadedly secured at its rear end by an end cap 142 which houses a drive shaft 144 extending longitudinally within and having a square end 146 which permits coupling to a chuck on a rotating device (not shown). The forward end 148 of the drive shaft 144 within the end cap 142 is coupled to a drive spindle 150 by means of a spindle coupling assembly 152. The forward end of drive spindle 150 is threaded for advancing into a threaded bore within plunger 128. The rear end of the drive spindle 150 is a circular disk 154 having a generally figure eight shaped opening 156 as shown in FIG. 4. The forward end 148 of drive shaft 144 also has a generally figure eight opening 158 as shown in FIG. 5. The forward face of forward end 148 also has a ball race 160 which is interrupted by pockets 162 oriented relative to opening 158 as illustrated in FIG. 5. A spindle coupling assembly 152 is positioned between the drive shaft 144 and the drive spindle 150 and is positioned centrally by a spindle coupling shaft 164. Spindle coupling assembly 152 has radial arms 166 about its circumference oriented with the lugs 168 to assure that thrust ball bearings 170 will be positioned on the segment of the ball race 160 between the pockets 162 on the face of the forward end 148 of drive shaft 144 when spindle coupling assembly 152 is in forward or clockwise driving relationship with drive shaft 144. A spring 172 positioned about spindle coupling shaft 164 maintains the spindle coupling assembly 152 at a predetermined distance from drive shaft 144. Thrust ball bearings 174 and 170 are positioned about the circumference of the drive shaft 144 and spindle coupling assembly 152, respectively. Thrust washer 176 has slotted openings 178 to permit limited rotational movement of pin 180 in drive shaft 144. Thrust collar 182 is held in place by pin 184 and restricts the axial freedom of drive shaft 144.

After assembly of the cutting tool 10, hydraulic fluid (which is incompressible, or at least substantially incompressible) is admitted into the piston chamber 22 and throughout the passages extending to the fluid chamber 136 of the plunger sleeve 114. The filling plug 66 seals the fluid within the respective regions described.

In operation, the cutting tool 10 is placed with its shaft 18 extending into a tube 12 to be cut. The depth of penetration of the cutting tool 10 into the tube 12 is determined by the length and position of annular flange 34 on cutter body 16. The embodiment of the cutting tool 10 shown in the drawings is adapted for cutting a portion of a tube 12 extending beyond a tube sheet 14. By loosening the set screw 28 the collar body 26 and thereby flange 34 can be positioned along different portions of the outer surface of the cutter body 16. In this manner, the cutting wheel 54 will correspondingly engage and cut different portions of tube 12 as desired. Thereafter, the tube 12 can be expanded or beaded to provide a secure fit relative to tube sheet 14 in the manner as disclosed in commonly assigned U.S. Pat. Nos. 4,090,382; 4,099,400; and 4,186,584 which are incorporated herein by reference.

Alternatively, by moving the collar body 26 sufficiently rearwardly on the cutter body 16, the cutting wheel 54 can be positioned to engage the tube 12 on the other side of sheet 14. In this fashion, the tube 12 if already beaded can be cut at both ends and readily removed from the respective sheets 14.

The rearmost end of cutting tool 10, i.e., square end 146 is secured to a rotating chuck which is attached to and rotatably driven by a suitable power driven device such as an electric drill. Initially the torque required to rotate tool 10 is greater than the torque required to advance plunger 128 forward. Thus when the drive shaft 144 is rotated clockwise this motion is transmitted to the drive spindle 150 which advances plunger 128 forwardly. In doing so, pressure builds up in the fluid within fluid chamber 136 and in turn is applied to the piston 52 which advances the cutting wheel 54 against the inside of tube 12. The pressure applied continues to advance the cutting wheel 54 so as to cut into the pipe 12 to a predetermined depth as determined by the force exerted by the regulator spring 96 about regulator piston 80. As the pressure exerted by the plunger 128 increases, regulator piston 80 further compresses spring 96 permitting spring 138 to advance regulator valve ball 126 to approach seat 124. When the pressure reaches a predetermined magnitude, the regulator valve member 126 biased between projection 110 and spring 138 advances to seal seat 124. At this time, no further increase in force on the piston 52 can take place and tool 10 rotates so that a circumferential cutting of the tube 12 takes place.

Because of the penetration of cutter wheel 54 into the wall of the tube 12, the torque required to initiate rotation of the entire tool 10 is much greater than that required to generate the pressure or force needed for initial penetration and greater than that required to continue rotation after the cutter wheel 54 has made its first revolution around the tube. The high torque input required to initiate rotation of tool 10 causes the pressure on the plunger 128 side of the regulator valve ball 126 to greatly exceed that being experienced by the cutter piston 52.

When the tool 10 completes its initial rotation and cutter wheel 54 returns to its point of origin, the reduction in reaction force experienced by the piston 52 causes a reduction in pressure below that predetermined by the setting of the regulator valve spring 96.

At this point, the force exerted by spring 96 advances projection 110 along with regulator valve ball 126 rearwardly. This permits the high pressure to bleed through the regulator valve to maintain the desired pressure and force on the cutter piston 52. This bleeding may occur either in discrete successive stages or steps or on a continuous basis during the cutting process. In the former case, the cutting will take place in discrete successive stages or steps, and in the latter, the cutting will take place relatively continuously. Since the drive shaft 144 is constantly rotating, the pressure is maintained while the cutting wheel 54 advances additional increments into tube 12. Normally there is continuous rotation of the entire tool 10 while a gradual advancement of the cutter wheel 54 takes place due to the fact that continuous penetrating force is maintained by relative rotation of drive shaft 144 relative to tool 10. This relative rotation advances plunger 128 to maintain the predetermined pressure or force. This action continues until the cutter wheel 54 breaks through the tube 12 and cutter piston 52 immediately moves out to the limit of its travel severing the tube 12 completely. At this point the components of the tool 10 are in the relative positions indicated in FIGS. 2A and 2B and FIGS. 4, 5 and 6. The torque input which produces pressure creates a thrust force rearwardly on drive spindle 150 through thrust ball bearings 170 to race 160 on the face of drive shaft 144 and through thrust bearing 174 to thrust washer 176 against face 186 of end cap 142. Because of the slack or lost motion permitted to pin 180 by the open space 178 in thrust washer 176 and the figure eight space 158 between spindle coupling assembly 152 and drive shaft 144 and the figure eight space 156 between spindle coupling assembly 152 and drive spindle 150, drive shaft 144 and spindle coupling assembly 152 can be freely rotated in the reverse direction permitting the thrust balls of ball bearing 170 to roll into pockets 162. The axial freedom or clearance provided thereby relieves all pressure and reaction forces to permit free rotation of the drive shaft 144, spindle coupling assembly 152 and drive spindle 150 until plunger 128 has been fully retracted. As plunger 128 is retracted, cutting wheel 54 descends downwardly and clear of any cut tube portions and is again available for further cutting.

Means are provided to prevent any seizing of drive spindle 150 with plunger 128 either by bottoming in the threaded portion or by having the splined end contact the disk 154 of drive spindle 150. The means consists of a spindle stop 188 having an upraised portion or tang raised from the rear face of spindle stop 188 having a cross-sectional face in the form of a 90° sector of a circle. Similarly the forward face of drive spindle 150 also has an upraised portion or tang 192 which cooperates with and engages the lateral face or tang 190. As a result of this structure, when spindle shaft 150 is being driven in a counter-clockwise direction to withdraw plunger 128, movement is stopped when tang 192 rotationally engages tang 190 with the avoidance of amy seizing.

Thus, as can be seen from the foregoing description my invention provides a safe, economical, and efficient one man operation for accurately cutting fire tubes and the like.

Having described the invention with particular reference to the preferred form, it will be obvious to those skilled in the art to which the invention pertains that various changes and modifications may be made without departing from the spirit and scope of the invention.

I claim:

1. An apparatus for cutting a portion of a tube comprising:
   a. housing means having a first end and a second end, the first end being configured and dimensioned for insertion into the tube to be cut;
   b. cutting means movably positioned within said housing means so as to be disposed adjacent the inner wall surface of the tube portion to be cut when the first end of the housing means is inserted within the tube;
   c. hydraulic means for both advancing said cutting means outwardly toward the tube portion so as to cause said cutting means to forcibly cut the inner wall surface of the tube to be cut and also for rotating the housing means so as to cause said cutting means to traverse a substantially inner circumferential path and to cut the inner wall of the tube to a predetermined depth corresponding to the level of penetration of said cutting means into the wall of the tube to be cut; and d. means cooperating with said hydraulic means for increasing the cutting force applied by said cutting means against the inner wall of the tube up to a predetermined and controlled force so as to cause said cutting means to correspondingly further penetrate the tube.

2. An apparatus for cutting a portion of a tube comprising:
   a. housing means having a first end and a second end, the first end being configured and dimensioned for insertion into the tube to be cut;
   b. cutting means movably positioned within said housing means so as to be disposed adjacent the inner wall surface of the tube portion to be cut when the first end of the housing is inserted within the tube;
   c. hydraulic means for both advancing said cutting means outwardly toward the tube portion so as to cause said cutting means to forcibly cut the inner wall surface of the tube to be cut and also for rotating the housing means so as to cause said cutting means to traverse a substantially inner circumferential path and to cut the inner wall of the tube to a predetermined depth corresponding to the level of penetration of said cutting means into the wall of the tube to be cut;
   d. means cooperating with said hydraulic means for increasing the cutting force applied by said cutting means against the inner wall of the tube up to a predetermined and controlled force so as to cause said cutting means to correspondingly further penetrate the tube; and
   e. means to progressively maintain said predetermined force applied by said cutting means against the inner wall surface portion of said tube as said housing means is caused to continuously rotate such that continuous rotation of said housing means results in progressively increasing internal cutting of the tube until said cutting means completely penetrates the wall of the tube so as to cut the tube.

3. An apparatus for cutting a portion of a tube comprising:
   a. housing means having a first end and a second end, the first end being configured and dimensioned for insertion into the tube to be cut;
   b. cutting means movably positioned within said housing means so as to be disposed adjacent the inner wall surface of the tube portion to be cut when the first end of the housing is inserted within the tube;
   c. hydraulic means for both advancing said cutting means outwardly toward the tube portion so as to cause said cutting means to forcibly cut the inner wall surface of the tube to be cut and also for rotating the housing means so as to cause said cutting means to traverse a substantially inner circumferential path and to cut the inner wall of the tube to a predetermined depth corresponding to the level of penetration of said cutting means into the wall of the tube to be cut;
   d. means cooperating with said hydraulic means for increasing the cutting force applied by said cutting means against the inner wall of the tube up to a predetermined and controlled force so as to cause said cutting means to correspondingly further penetrate the tube; and
   e. means to progressively maintain said predetermined force applied by said cutting means against the inner wall surface portion of the tube as said housing means is caused to intermittently rotate such that intermittent rotation of said housing means results in progressively increasing internal cutting of the tube until said cutting means completely penetrates the wall of the tube so as to cut the tube.

4. An apparatus for cutting a pipe comprising:
   a. housing means including:
      i. a cutter body having one end configured for insertion into at least a portion of a pipe to be cut, the cutter body having at least one aperture in a surface portion thereof, and at least one chamber therein being in communication with said aperture;
      ii. a collar disposed at the other end of the cutter body, the collar including a flange extending in spaced relationship about the cutter body toward the pipe portion to be cut, and said flange being configured so as to overlay the portion of the pipe to be cut;
   b. a piston configured and positioned within the chamber so as to be slidably moveable therein;
   c. at least one cutter wheel mounted and positioned on the piston so as to be moveable therewith; and,
   d. hydraulic means for both advancing the cutter wheel toward the portion of the pipe to be cut such that the cutter wheel cuts the portion of the pipe to a predetermined depth in each of a plurality of progressive successive stages and also for rotating the housing means between each of the progressive successive stages so as to permit the cutter wheel to circumferentially cut the portion of the pipe to a predetermined depth between said progressive successive stages.

5. An apparatus for cutting a pipe comprising:
   a. housing means including:
      i. a cutter body having one end configured for insertion into at least a portion of a pipe to be cut, the cutter body having at least one aperture in a surface portion thereof, and at least one chamber therein being in communication with said aperature;
      ii. a collar disposed at the other end of the cutter body, the collar including a flange extending in spaced relationship about the cutter body toward the pipe portion to be cut, and said flange being configured so as to overlay the portion of the pipe to be cut;
   b. a piston configured and positioned within the chamber so as to be slidably moveable therein;
   c. at least one cutter wheel mounted and positioned on the piston so as to be moveable therewith; and,
   d. hydraulic means for both advancing the cutter wheel toward the portion of the pipe to be cut such that the cutter wheel cuts the portion of the pipe to a predetermined depth and also for rotating the housing means such that the cutter wheel continuously circumferentially cuts the portion of the pipe to said predetermined depth.

6. The apparatus according to any of claims 4 and 5 wherein said hydraulic advancing and rotating means comprises:

a. hydraulic fluid disposed within the chamber and confined therein by the piston;

b. passageway positioned within said housing means in fluid communication with said chamber; and c. means for applying pressure to the hydraulic fluid within the chamber so as to advance the piston and thereby the cutter wheel toward the portion of the tube to be cut.

7. The apparatus according to claim 6 wherein the means for applying pressure comprises:

a. a regulator piston sealingly positioned within said passageway and having a generally tubular portion at one end thereof extending towards the rearward end of the cutter body, the regulator piston having an axial bore in fluid communication with the piston chamber;

b. a regulator valve disposed at the other end of the regulator piston, the regulator valve having an axial bore in fluid communication with the axial bore of the regulator piston, the axial bore of the regulator valve having a seat therein; and c. means for sealing the piston chamber against any further pressure buildup after the pressure developed against the chamber piston is sufficient to advance the cutter wheel to said predetermined depth.

8. The apparatus according to claim 7 wherein the sealing means comprises a valve member having a configuration compatible with the seat of the regulator valve.

9. The apparatus according to claim 8 wherein the valve member is ball shaped.

10. The apparatus according to claim 9 further comprising a first spring under compression disposed about the regulator piston so as to bias the valve member away from the seat of the regulator valve.

11. The apparatus according to claim 10 further comprising a second spring under compression so as to bias the valve member toward the seat of the regulator valve.

12. The apparatus according to claim 11 wherein the housing means further includes:

a. a plunger body defining a plunger chamber therein in fluid communication serially with the axial bore of the regulator valve, the axial bore of the regulator piston, and the piston chamber; and b. a plunger piston disposed within the plunger chamber such that movement of the plunger piston in the direction of the one end of the cutter body member decreases the volume of the plunger chamber so as to provide for transmission of a pressure by means of the hydraulic fluid against the piston within the chamber of the cutter body member and thereupon the advancement of the cutter wheel to said predetermined depth of penetration.

* * * * *